US010989147B2

(12) United States Patent
Won

(10) Patent No.: US 10,989,147 B2
(45) Date of Patent: Apr. 27, 2021

(54) AIR-FUEL RATIO CONTROL METHOD REFLECTING BRAKE BOOSTER INFLOW FLOW RATE

(71) Applicants: HYUNDAI MOTOR COMPANY, Seoul (KR); KIA MOTORS CORPORATION, Seoul (KR)

(72) Inventor: Min-Kyu Won, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/701,289

(22) Filed: Dec. 3, 2019

(65) Prior Publication Data

US 2020/0256284 A1  Aug. 13, 2020

(30) Foreign Application Priority Data

Feb. 12, 2019 (KR) .................. 10-2019-0016168

(51) Int. Cl.
*F02M 23/08* (2006.01)
*F02M 35/10* (2006.01)
*F02D 41/00* (2006.01)
*F02D 41/30* (2006.01)
*F02D 41/18* (2006.01)

(52) U.S. Cl.
CPC ......... *F02M 23/08* (2013.01); *F02D 41/0002* (2013.01); *F02D 41/187* (2013.01); *F02D 41/3005* (2013.01); *F02M 35/10229* (2013.01); *F02D 2200/0402* (2013.01); *F02D 2200/0406* (2013.01)

(58) Field of Classification Search
CPC .. F02M 23/08; F02M 35/10229; F02D 33/00; F02D 41/0002; F02D 41/187; F02D 41/3005; F02D 2200/0402; F02D 2200/0406
See application file for complete search history.

(56) References Cited

U.S. PATENT DOCUMENTS

| 5,826,559 A * | 10/1998 | Ichimoto ................. F02D 41/32 |
| | | 123/295 |
| 5,918,462 A * | 7/1999 | Mitani .................... B60T 13/52 |
| | | 123/339.14 |
| 2004/0016417 A1 * | 1/2004 | Kerns ................... F02D 41/222 |
| | | 123/435 |
| 2011/0183812 A1 * | 7/2011 | Cunningham .......... B60T 13/72 |
| | | 477/183 |
| 2013/0179053 A1 * | 7/2013 | Matsunaga ........... F02N 11/084 |
| | | 701/112 |

(Continued)

FOREIGN PATENT DOCUMENTS

KR          10-0203093 B1    6/1999

*Primary Examiner* — Sizo B Vilakazi
*Assistant Examiner* — Anthony L Bacon
(74) *Attorney, Agent, or Firm* — Brinks Gilson & Lione

(57) ABSTRACT

An air-fuel ratio control method reflecting a brake booster inflow flow rate includes: determining a deviation between an actually measured pressure of an intake manifold and a model pressure of the intake manifold is equal to or greater than a predetermined value; determining that the deviation is caused by a brake operation; correcting an intake air amount by reflecting a flow rate flowing into the intake manifold from a brake booster; and performing an air-fuel ratio control based on the corrected intake air amount.

15 Claims, 5 Drawing Sheets

(56) References Cited

U.S. PATENT DOCUMENTS

| | | | |
|---|---|---|---|
| 2015/0000634 A1* | 1/2015 | Martin | F02M 35/10229 |
| | | | 123/323 |
| 2016/0245199 A1* | 8/2016 | Pursifull | F01M 13/0011 |
| 2017/0137011 A1* | 5/2017 | Zhang | F01P 1/06 |
| 2017/0166179 A1* | 6/2017 | Fujita | B60T 17/02 |
| 2017/0254284 A1* | 9/2017 | Yamaguchi | F02D 41/107 |

* cited by examiner

AIR-FUEL RATIO CONTROL METHOD REFLECTING BRAKE BOOSTER INFLOW FLOW RATE

CROSS-REFERENCE TO RELATED APPLICATION

This application claims priority to and the benefit of Korean Patent Application No. 10-2019-0016168, filed on Feb. 12, 2019, the entire contents of which are incorporated herein by reference.

FIELD

The present disclosure relates to an air-fuel ratio control method reflecting a brake booster inflow flow rate.

BACKGROUND

The statements in this section merely provide background information related to the present disclosure and may not constitute prior art.

An air-fuel ratio indicates a ratio of air to fuel transmitted into a combustion chamber of an engine for each cycle, and a value of the air-fuel ratio should be kept within a specific limit in order to ensure an operation suitable for the engine. For this purpose, it is important to accurately calculate the amount of air flowing into an intake manifold.

Conventionally, as disclosed in Korean Patent No. 10-0203093 (Jun. 15, 1999), a method to model the amount of air flowing into the intake manifold includes: measuring an absolute pressure $P_s$ of a surge tank of the intake manifold by a Manifold Absolute Pressure (MAP) sensor 3 illustrated in FIG. 1 and converting it into the amount of air.

Although an Exhaust Gas Recirculation (EGR) apparatus composed of an EGR cooler 11 and an EGR valve 12 has been applied to a vehicle in order to solve an environmental pollution problem caused by an exhaust gas, we have discovered that the accuracy of the air amount model has been lowered when the amount of air is modeled by only the MAP sensor 3 due to the presence of the EGR gas flowing into an intake manifold 13. Therefore, in order to improve the accuracy of the air amount model, a Mass Air Flow (MAF) sensor 1 for directly measuring the amount of air has been installed at the front end of a throttle valve 2, and the flow rate of the fresh air component flowing into the engine has directly been measured by using the MAF sensor 1 and has been used for calculating the amount of air. Meanwhile, as illustrated in FIG. 1, a brake booster 4 is provided in a vehicle in order to boost a force of a master cylinder when a driver depresses a brake pedal 5 of the vehicle to operate a brake. Then, in order to boost the force of the master cylinder, the brake booster 4 is connected to the intake manifold 13 formed with a negative pressure to use the negative pressure of the intake manifold.

Therefore, when the driver depresses the brake pedal 5 to operate the brake, a certain amount of fresh air component flows into the intake manifold 13 from the brake booster 4. Therefore, in a harsh mode in which the driver repeatedly applies the brake, a large amount of fresh air component flows into the intake manifold 13.

As described above, since the mounting position of the MAF sensor 1 is the front end of the throttle valve 2, we have also found that it is difficult to reflect the air flowing into the intake manifold 13, and that even when the brake is repeatedly applied and a large amount of fresh air component flows into the intake manifold 13 from the brake booster 4, it cannot be recognized by the MAF sensor 1, and therefore, a deviation between the actual air amount and the air amount model modeled from the measured value of the MAF sensor 1 becomes large. As a result, an air-fuel ratio control cannot be performed accurately, thereby possibly occurring misfire phenomenon.

Meanwhile, in this case, since the actual air amount is greater than the modeled air amount, the inside of a combustion chamber of an engine 6 becomes a lean combustion state. At this time, based on a lambda measured value of the exhaust gas from a lambda sensor 7 installed in an exhaust system at the rear end of the engine 6, a lambda control unit 8 performs a feedback control (lambda control) to increase the amount of fuel, thereby preventing misfire. Therefore, when the amount of air flowing into from the brake booster 4 is small, it can be compensated to some extent by the lambda control. However, we have discovered that when a large amount of fresh air component flows into from the brake booster 4, it becomes a lean combustion state where a value of the air-fuel ratio exceeds a predetermined limit value (e.g., 1.5), the feedback control by the lambda control unit 8 is stopped, such that it is also difficult to prevent misfire by the lambda control.

SUMMARY

The present disclosure provides an air-fuel ratio control method, which can reflect the fresh air component flowing into the intake manifold 13 from the brake booster 4 to an air-fuel ratio control, thereby improving the accuracy of the control.

An air-fuel ratio control method according to one form of the present disclosure includes: measuring, by a manifold absolute pressure (MAP) sensor, an absolute pressure of an intake manifold of a vehicle; comparing, by a controller, the measured absolute pressure with a model pressure of the intake manifold calculated based on an intake air amount measured by an air flow sensor; determining, by the controller, whether a deviation between the measured absolute pressure and the model pressure of the intake manifold is equal to or greater than a predetermined value; determining, by the controller, whether the deviation is caused by a brake operation when the deviation is equal to or greater than the predetermined value; correcting, by the controller, the intake air amount based on a rate of a brake inflow flowing into the intake manifold from a brake booster when it is determined that the deviation is caused by the brake operation; calculating, by the controller, a cylinder intake air amount based on the corrected intake air amount; and performing, by the controller, an air-fuel ratio control based on the calculated cylinder intake air amount.

In one form, in correcting the intake air amount, an inflow air amount by the brake booster is obtained by using a map in which the deviation between the measured absolute pressure and the model pressure is used as an input value, and then the inflow air amount by the brake booster is obtained, and the intake air amount measured by the air flow sensor is corrected by using the calculated inflow air amount by the brake booster.

Meanwhile, when it is determined that the deviation is not a deviation occurred by the brake operation, the correction of the inflow air amount is not performed by trusting the measured result of the air flow sensor. That is, the inflow air amount by the brake booster is set to 0.

Alternatively, the correcting the intake air amount comprises: calculating a pressure corrected amount by subtracting an effective pressure deviation in a normal state from the deviation between the measured absolute pressure and the model pressure of the intake manifold; and correcting the model pressure of the intake manifold based on the measured intake air amount and the pressure corrected amount, and wherein the cylinder intake air amount is calculated by using the corrected model pressure of the intake manifold.

Meanwhile, even in this case, when it is determined that the deviation is not a deviation occurred by the brake operation, the correction of the inflow air amount is not performed by trusting the measured result of the air flow sensor. That is, the pressure corrected amount is set to 0.

An air-fuel ratio control method according to another form of the present disclosure for solving the above problems includes: determining, by a controller, whether a deviation between an actually measured pressure of an intake manifold and a model pressure of the intake manifold calculated based on an intake air amount measured by an air flow sensor is equal to or greater than a predetermined value, wherein the actually measured pressure is measured by a manifold absolute pressure (MAP) sensor; determining, by the controller, whether the deviation is caused by a brake operation when the deviation has occurred between the actually measured pressure and the model pressure; calculating, by the controller, a cylinder intake air amount by using the actually measured pressure of the intake manifold measured by the MAP sensor when it is determined that the deviation is caused by the brake operation; and performing, by the controller, an air-fuel ratio control based on the calculated cylinder intake air amount.

Meanwhile, when it is determined that the deviation is not a deviation occurred by the brake operation, the cylinder intake air amount is calculated by using the model pressure of the intake manifold using the measured intake air amount rather than the actually measured pressure of the intake manifold, and an air-fuel ratio control is performed based on the calculated cylinder intake air amount.

In other form, the correcting the intake air amount can correct the intake air amount by using the basic capacity of the brake booster and the number of repetitions of a brake. More specifically, the correcting the intake air amount calculates an inflow air amount by the brake booster by using a map in which the basic capacity of the brake booster and the number of repetitions of the brake are used as an input value, and the inflow air amount by the brake booster is used as an output value, and corrects the inflow air amount measured by the air flow sensor by using the calculated inflow air amount by the brake booster.

In other aspect of the present disclosure, the correcting the intake air amount can correct the intake air amount by using a change amount per hour of the actually measured pressure of the intake manifold. More specifically, the correcting the intake air amount calculates an inflow air amount by the brake booster by using a map in which the change amount per hour of the actually measured pressure of the intake manifold measured by the MAP sensor is used as an input value, and the inflow air amount by the brake booster is used as an output value, and corrects the inflow air amount measured by the air flow sensor by using the calculated inflow air amount by the brake booster.

Meanwhile, when the corrected intake air amount is excessively large to exceed a lambda control limit, a problem in which a lambda control cannot be performed occurs. Therefore, in order to prevent such a problem in advance, when it is determined that the deviation is a deviation occurred by the brake operation, a target injected fuel amount rather than the intake air amount can be corrected by reflecting a flow rate flowing into the intake manifold from the brake booster, and the air-fuel ratio control can also be performed based on the corrected target injected fuel amount.

In addition, when the vehicle includes a lambda control unit for feedback-controlling an air-fuel ratio based on the measured value of a lambda sensor under an activation condition in which the air-fuel ratio is within a predetermined range, the air-fuel ratio control considering the brake booster inflow flow rate can feedback-control the air-fuel ratio based on the measured value of the lambda sensor even in a lean condition where the air-fuel ratio is out of the predetermined range, thereby also solving the problem in which the lambda control cannot be performed.

Then, if it is determined that the vehicle is in a stop state, an engine is in an idle state, and a brake is being operated by a brake pedal sensor when the deviation has occurred between the actually measured pressure and the model pressure, it is determined that the deviation is a deviation occurred by the brake operation.

According to the present disclosure, it is possible to accurately calculate the air amount flowing into the combustion chamber of the engine by reflecting the air amount flowing into from the brake booster, thereby performing a stable air-fuel ratio control.

In one form, the air-fuel ratio control method reflecting the brake booster inflow flow rate further includes determining whether to satisfy an intake air amount correctable condition, and when the intake air amount correctable condition has been satisfied, the intake air amount is corrected. Then, when a coolant temperature of an engine is within a predetermined certain range, and the MAP sensor and the air flow sensor are normally operating during a certain time after start-up, it is determined that the intake air amount correctable condition has been satisfied.

According to the present disclosure, the correction of the intake air amount is not performed when the operating state of the vehicle is not in a state suitable for applying the amount of air flowing into the intake manifold from the brake booster to the air-fuel ratio control, thereby performing a stable air-fuel ratio control.

In addition, since the air-fuel ratio control problem according to the brake booster inflow flow rate becomes a problem when the vehicle is in the stop state and in the idle state, as another form, the air-fuel ratio control method reflecting the brake booster inflow flow rate further includes confirming whether an engine is in an idle state and in a stop state, and when it is determined that the engine has been in the idle state and in the stop state, the air-fuel ratio control reflecting the brake booster inflow flow rate is performed.

According to the air-fuel ratio control method according to the present disclosure, it is possible to accurately calculate the amount of air flowing into the combustion chamber of the engine by reflecting the amount of air flowing into from the brake booster, thereby providing stable combustion.

In addition, according to the air-fuel ratio control method according to the present disclosure, it is possible to suppress the occurrence of misfire caused by the failure of the air-fuel ratio control, thereby reducing the problem of generating the exhaust gas caused by the occurrence of misfire.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 4:
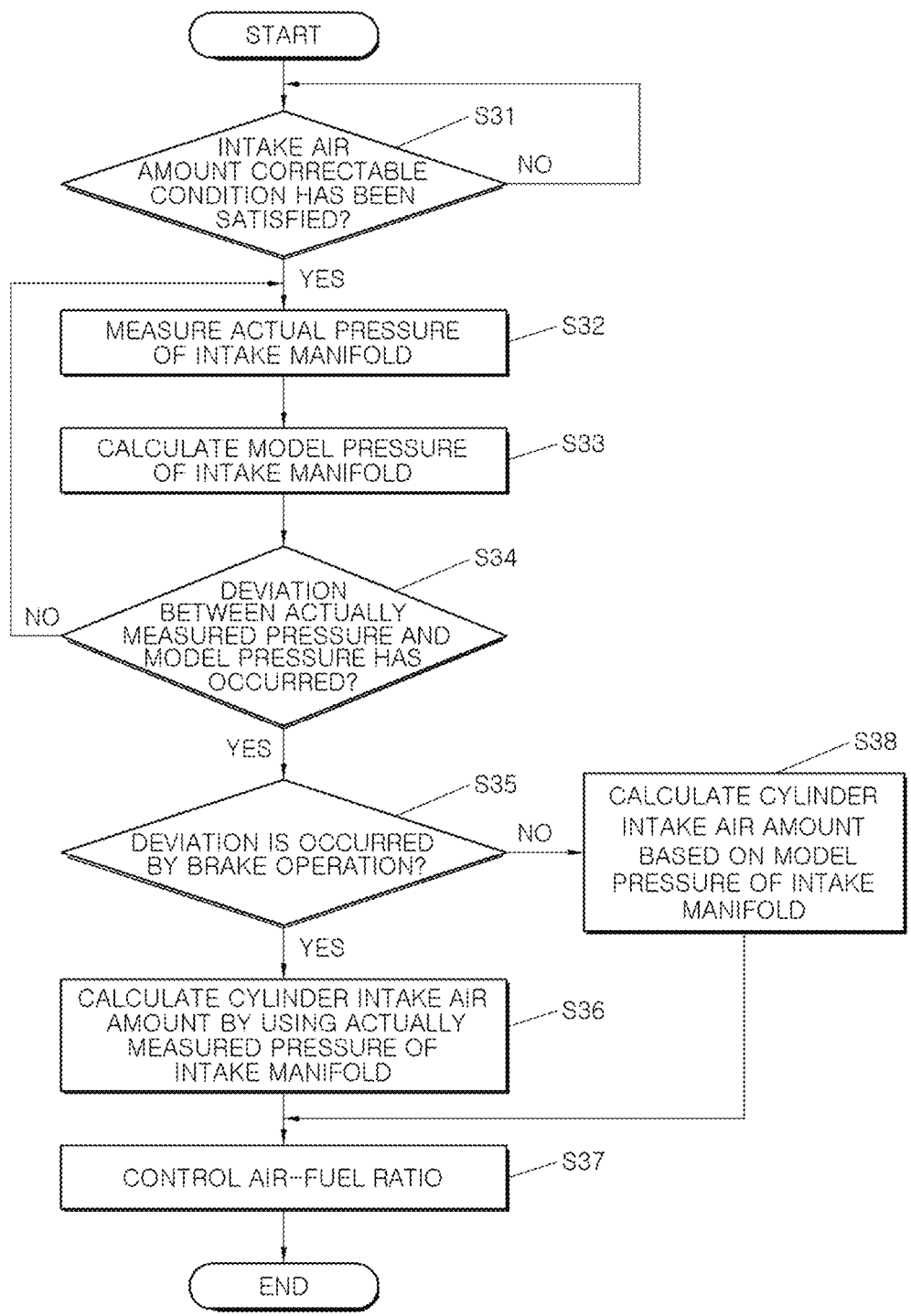
Figure 5:
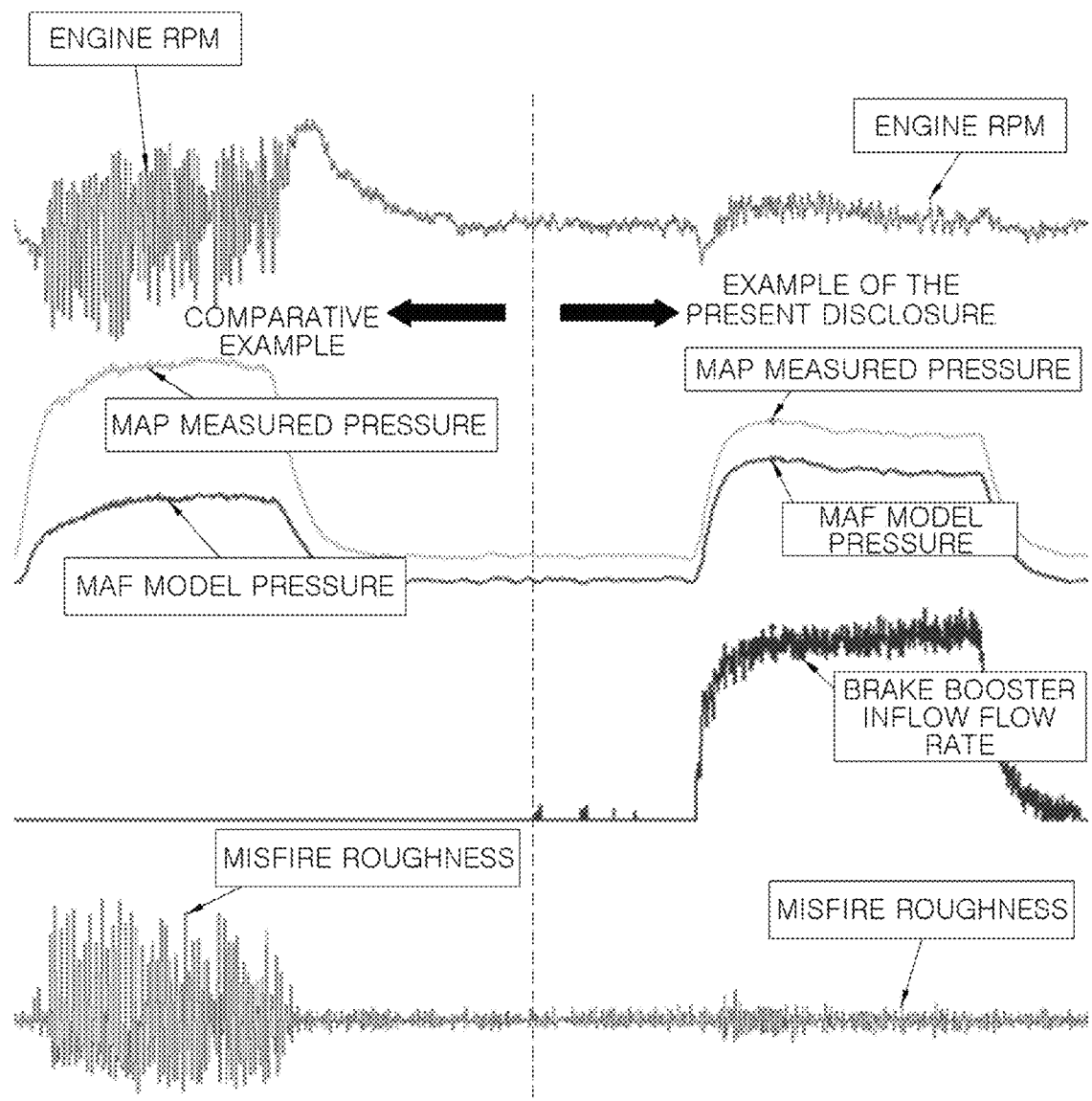

FIG. 4 is a flowchart illustrating an air-fuel ratio control method according to still another form of the present disclosure; and FIG. 5 is a graph illustrating the result of comparing an engine RPM, the deviation between the actually measured pressure by a MAP sensor and the model pressure by a MAF sensor, and the misfire roughness in an example of the present disclosure and a comparative example.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

However, the detailed description of known functions and configurations that can unnecessarily obscure the subject matter of the present disclosure will be omitted.

Figure 2:
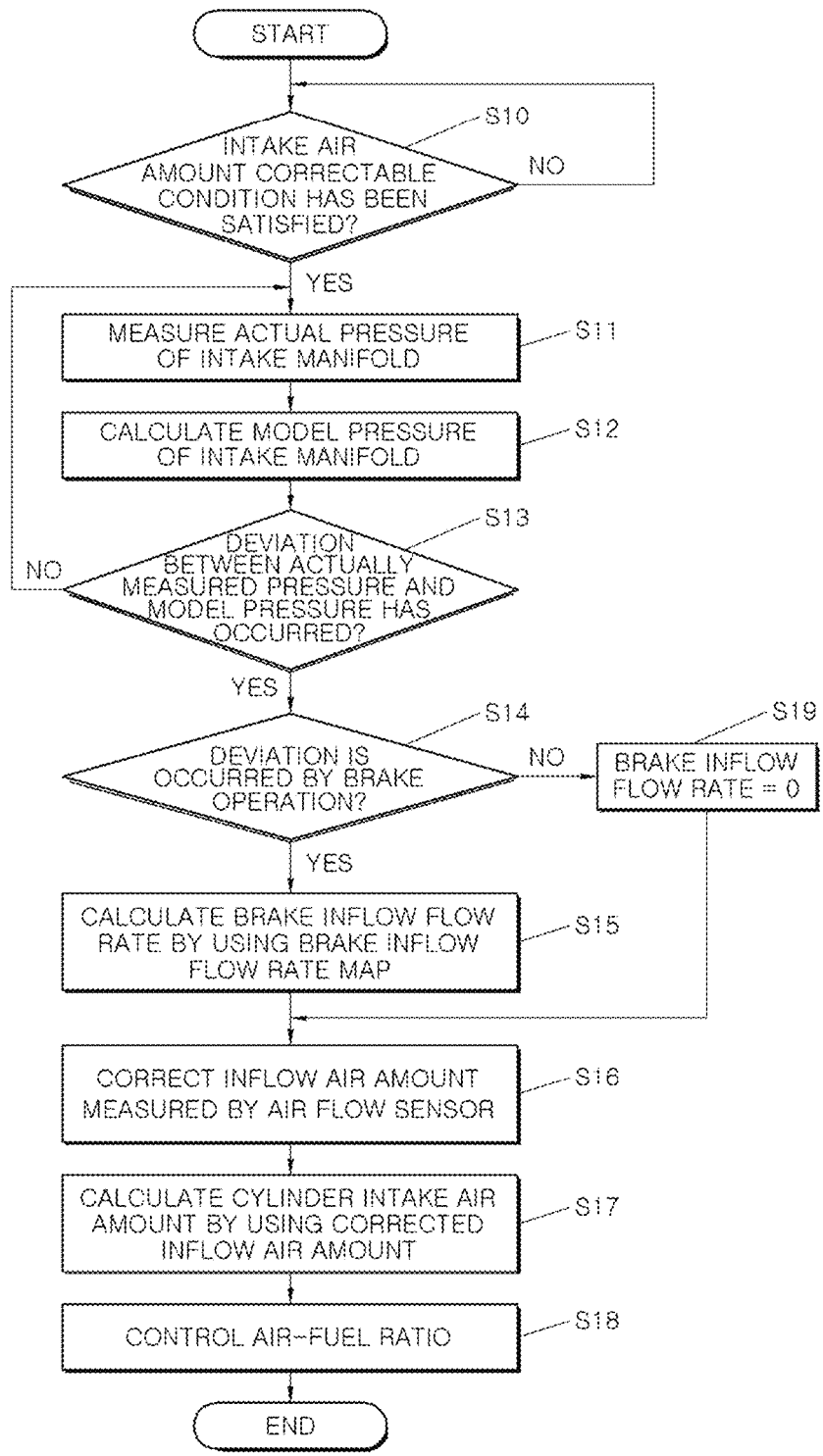
FIG. 2 is a flowchart illustrating an air-fuel ratio control method according to one form of the present disclosure.

FIG. 2 is a flowchart illustrating an air-fuel ratio control method according to one form of the present disclosure.

As illustrated in FIG. 2, when performing the air-fuel ratio control method, it is firstly determined whether an intake air amount correctable condition has been satisfied at step S10. The intake air amount correctable condition is a condition for determining whether it is an operating state of an engine suitable for applying the amount of air flowing into the intake manifold 13 from the brake booster 4 to an air-fuel ratio control. For example, when the engine is in a cold state or an abnormality has occurred in the operating state of the MAP sensor 3 or the MAF sensor 1 required for performing the control method, it is inappropriate to perform the control method according to the present disclosure. Therefore, it is determined that the intake air amount correctable condition has been satisfied when the coolant temperature of an engine is within a predetermined certain range, and the MAP sensor 3 and the MAF sensor 1 are normally operating during a certain time after start-up.

When it is determined that the intake air amount correctable condition has been satisfied, an Engine Control Unit (ECU) provided in a vehicle allows the MAP sensor 3 to measure an absolute pressure (actually measured pressure) in a surge tank of the intake manifold 13 S11, while the ECU calculates the model pressure in the intake manifold 13 based on the intake air amount measured from the MAF sensor 1 S12.

The model pressure in the intake manifold 13 can be calculated by inputting the measured intake air amount into a predetermined map. For example, according to the gas state equation, the pressure $P_s$ and the intake air amount G of the surge tank in the intake manifold 13 have the relationship such as the following Equation 1.

$$P_S = \frac{2 \cdot R \cdot T}{\eta \cdot V_C \cdot N_e} G \quad \text{Equation 1}$$

In the Equation 1, R refers to the gas constant, T to the temperature in the intake manifold, $\eta$ to the volume efficiency of the intake air stored in the ECU by an engine load and a map, $V_c$ to the cylinder volume, and $N_e$ to the engine RPM.

The model pressure in the intake manifold 13 can be calculated from the intake air amount measured from the MAF sensor 1 by using the relationship.

When the actually measured pressure and the model pressure in the intake manifold 13 are obtained, the ECU determines whether a deviation between the actually measured pressure and the model pressure in the intake manifold 13 S13 is equal to or greater than a predetermined magnitude. A predetermined pressure deviation is present between the actually measured pressure and the model pressure in the intake manifold 13 even in a normal state where there is no disturbance such as an operation of the brake booster 4. However, as illustrated even in the left portion of the graph of FIG. 5, when the brake booster 4 is operated to flow air into the intake manifold 13, a pressure deviation greater than the pressure deviation in the normal state occurs between the model pressure based on the MAF sensor 1, which cannot sense the inflow of such air, and the actually measured pressure.

When it is determined that the deviation equal to or greater than the predetermined magnitude has occurred between the actually measured pressure and the model pressure in the intake manifold 13, the ECU determines whether the deviation has been occurred by the brake operation S13. For example, if it is determined that the vehicle is in a stop state, the engine is in an idle state, the brake is being operated (using a brake pedal sensor) and the deviation equal to or greater than the predetermined magnitude, the ECU determines that the deviation is caused by the brake operation.

When it is determined that the deviation between the actually measured pressure and the model pressure has been occurred by the brake operation, the ECU calculates a rate of a brake inflow flowing into the intake manifold 13 from the brake booster 4 by using a predetermined brake inflow flow rate map S15. The brake inflow flow rate map is a map obtained through the previously performed learning, which relates to the relationship between the pressure deviation between the actually measured pressure and the model pressure and the amount of air flowing into the intake manifold from the brake booster. When the pressure deviation between the actually measured pressure and the model pressure is input as an input value to the map stored in the ECU, a value of the inflow air amount by the brake booster can be obtained.

When the value of the inflow air amount by the brake booster is obtained, the ECU corrects the intake air amount measured by the MAF sensor 1 with the obtained brake inflow flow rate S16. That is, a value calculated by adding the brake inflow flow rate to the intake air amount measured by the MAF sensor 1 is defined as the corrected intake air amount.

Meanwhile, when it is not determined that the deviation between the actually measured pressure and the model pressure is occurred by the brake operation, the ECU does not perform the correction by trusting the model pressure result of the intake manifold by the MAF sensor 1. Therefore, in this case, the brake inflow flow rate is set to 0 S19.

After correcting the intake air amount measured by the MAF sensor 1 with the obtained brake inflow flow rate, the ECU calculates a cylinder intake air amount by using the corrected intake air amount S17. Specifically, the ECU calculates the model pressure value of the intake manifold based on the corrected intake air amount, and calculates the amount of air flowing into the cylinder by using the calculated model pressure. The amount of air flowing into the cylinder can be determined, for example, by the following Equation 2.

$$G_{CYL}=a \times P_{MODEL}+b \qquad \text{<Equation 2>}$$

In the Equation 2, $G_{CYL}$ refers to the cylinder inflow air amount, $P_{MODEL}$ to the corrected model pressure of the intake manifold, and a, b are determined by repeated tests as variables defined according to the temperature of the intake manifold, the opening and closing timing of the intake/exhaust valves, and the engine RPM.

When the cylinder intake air amount is calculated, the ECU controls a fuel nozzle, etc. to perform an air-fuel ratio control for adjusting the amount of fuel in order to satisfy a proper air-fuel ratio based on the calculated cylinder intake air amount S18.

Figure 3:
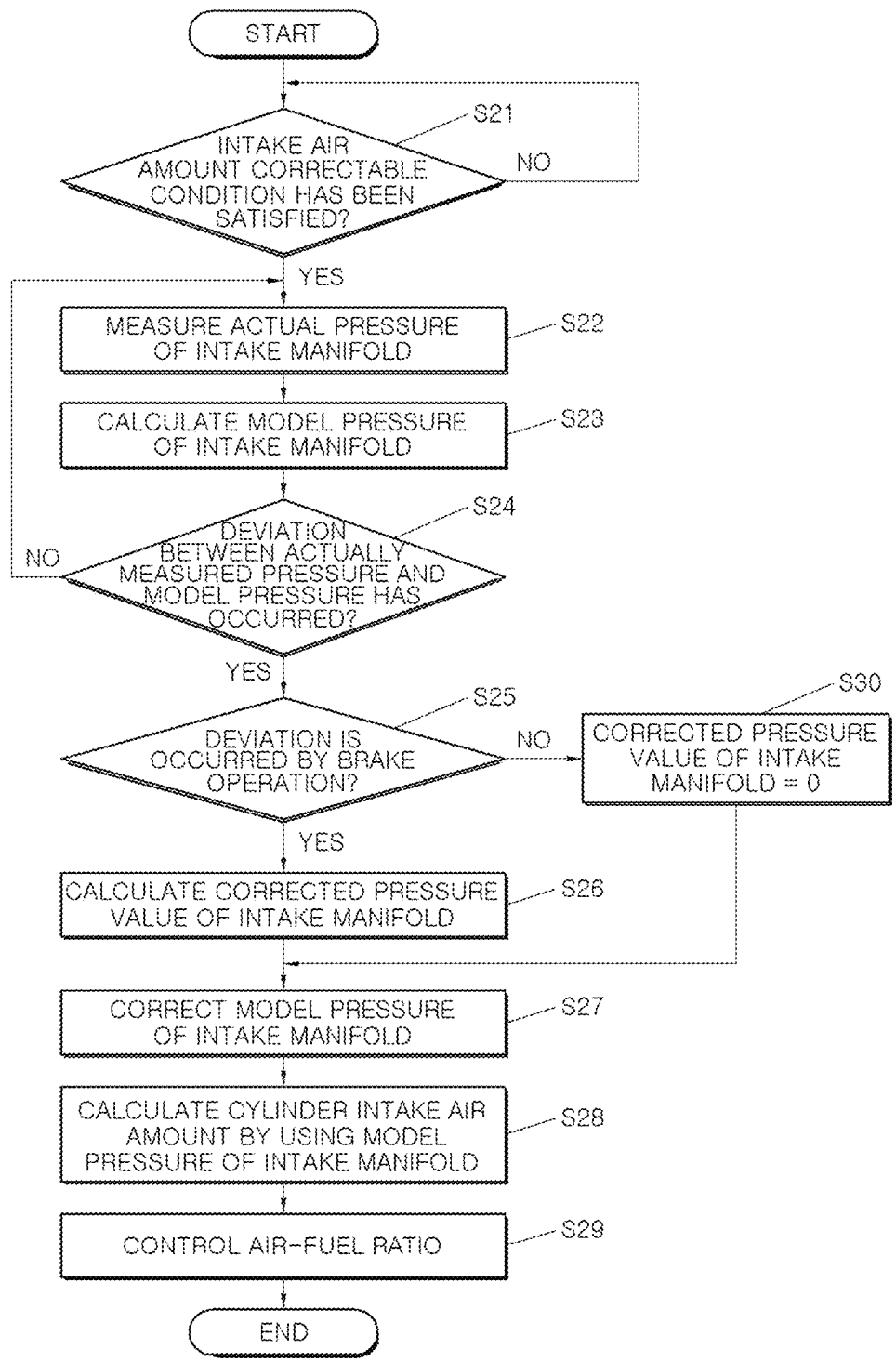
FIG. 3 is a flowchart illustrating an air-fuel ratio control method according to another form of the present disclosure.

FIG. 3 is a flowchart illustrating an air-fuel ratio control method according to another form of the present disclosure. The form illustrated in FIG. 3 is partially different from the form illustrated in FIG. 2 in the specific method for reflecting it to the air-fuel ratio control when it is determined that the deviation of the predetermined magnitude or more between the actually measured pressure and the model pressure in the intake manifold 13 has been occurred by the brake operation.

Therefore, S21, S22, S23, S24, and S25 illustrated in FIG. 3 are substantially the same as the S10, S11, S12, S13, and S14 illustrated in FIG. 2, respectively. Therefore, a duplicate description thereof will be omitted.

In S25, when it is determined that the deviation of the predetermined magnitude or more between the actually measured pressure and the model pressure in the intake manifold 13 has been occurred by the brake operation, the ECU calculates a corrected pressure value for correcting the calculated model pressure of the intake manifold 13 by using the MAF sensor 1 S26. As described above, a predetermined pressure deviation is present between the actually measured pressure and the model pressure in the intake manifold 13 even in a normal state where there is no disturbance such as the operation of the brake booster 4. Therefore, the deviation between the actually measured pressure and the model pressure in the normal state can be regarded as the pressure increase amount by the air flowing into from the brake booster 4. By using the above, a value obtained by subtracting an effective pressure deviation in the normal state from the pressure deviation amount between the actually measured pressure and the model pressure can be calculated as a pressure corrected value.

When the pressure corrected value is calculated, the ECU corrects the model pressure value of the intake manifold by using the pressure corrected value S27. Specifically, a value obtained by adding the calculated pressure corrected value to the calculated model pressure value of the intake manifold 13 based on the intake air amount measured by the MAF sensor 1 is defined as a corrected model pressure value.

Meanwhile, when it is not determined that the deviation between the actually measured pressure and the model pressure has been occurred by the brake operation, the ECU does not perform the correction of the model pressure value by trusting the model pressure result of the intake manifold by the MAF sensor 1. Therefore, in this case, the pressure corrected value is set to 0 S30.

When the corrected model pressure value of the intake manifold is calculated, the ECU calculates the amount of air flowing into the cylinder by using the corrected model pressure S28. The amount of air flowing into the cylinder can be calculated by using the above-described Equation 2.

Then, when the cylinder intake air amount is calculated, the ECU controls a fuel nozzle, etc. to perform an air-fuel ratio control for adjusting the amount of fuel in order to satisfy a proper air-fuel ratio based on the calculated cylinder intake air amount S29.

FIG. 4 is a flowchart illustrating an air-fuel ratio control method according to still another form of the present disclosure. The form illustrated in FIG. 4 is partially different from the forms illustrated in FIGS. 2 and 3 in the specific method for reflecting it to an air-fuel ratio control when it is determined that the deviation of the predetermined magnitude or more between the actually measured pressure and the model pressure in the intake manifold 13 has been occurred by the brake operation.

Figure 1:
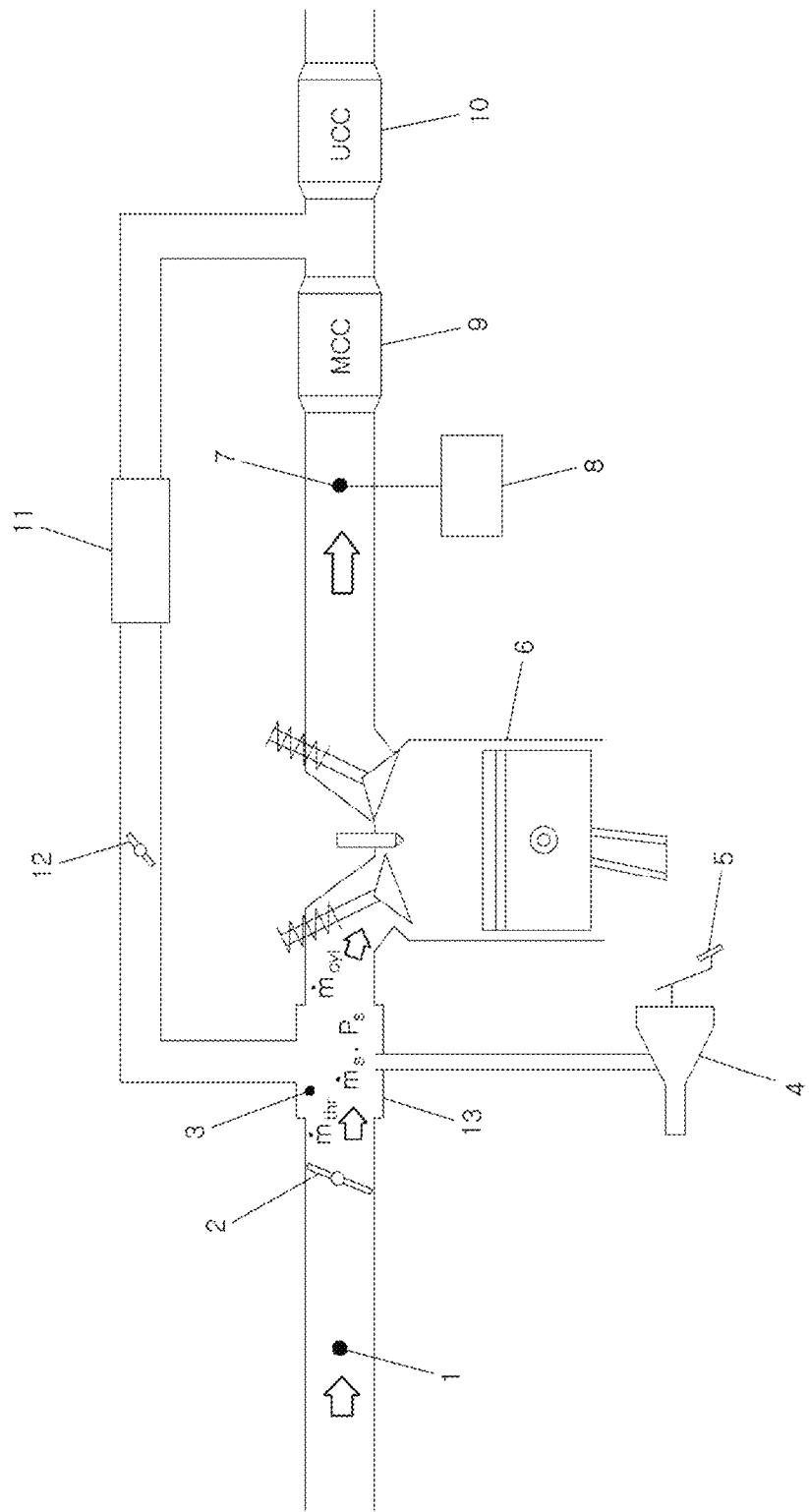
FIG. 1 is a diagram schematically illustrating an intake system and an exhaust system of an engine.

Therefore, S31, S32, S33, S34, and S35 illustrated in FIG. 4 are substantially the same as the S10, S11, S12, S13, and S14 illustrated in FIG. 1, respectively. Therefore, a duplicate description thereof will be omitted.

In S35, when it is determined that a deviation of a predetermined magnitude or more between the actually measured pressure and the model pressure in the intake manifold 13 has been occurred by the brake operation, it is difficult to trust the measured result of the MAF sensor 1, such that the ECU calculates a cylinder intake air amount by using the pressure actually measured by the MAP sensor 3 (actually measured pressure) rather than the model pressure of the intake manifold using the MAF sensor 1 S36. For example, the cylinder intake air amount can be calculated by the following Equation 3 that replaces the corrected model pressure in the Equation 2 with the actually measured pressure.

$$G_{CYL}=a \times P_{ACT}+b \qquad \text{<Equation 3>}$$

In the Equation 3, $G_{CYL}$ refers to the cylinder inflow air amount, $P_{ACT}$ to the actually measured pressure of the intake manifold, and a, b are determined by repeated tests as variables defined according to the temperature of the intake manifold, the opening and closing timing of the intake/exhaust valves, and the engine RPM.

Meanwhile, when it is not determined that the deviation between the actually measured pressure and the model pressure has been occurred by the brake operation, the ECU calculates the cylinder intake air amount based on the model pressure result of the intake manifold by trusting the model pressure result of the intake manifold by the MAF sensor 1 S38.

When the cylinder intake air amount is calculated, the ECU controls a fuel nozzle, etc. to perform an air-fuel ratio control for adjusting the amount of fuel in order to satisfy a proper air-fuel ratio based on the calculated cylinder intake air amount S37.

FIG. 5 illustrates the result of comparing the case that has performed the air-fuel ratio control by the form according to FIG. 1 (example of the present disclosure) with the conventional case that has not reflected the brake booster inflow flow rate (comparative example).

As illustrated in the comparative example of FIG. 5, conventionally, the brake booster inflow flow rate was not considered at all. Therefore, although the difference between the model pressure and the actually measured pressure in the intake manifold 13 was large by the brake booster inflow flow rate, the air-fuel ratio control reflecting the brake booster inflow flow rate was not performed, such that the operating state (RPM) of an engine upon operation of the brake became unstable, and the possibility of misfire (misfire roughness) was remarkably increased.

In contrast, according to the example of the present disclosure, it was possible to calculate the brake booster inflow flow rate through modeling and to reflect it to the air-fuel ratio control, thereby reducing the difference between the model pressure and the actually measured pressure in the intake manifold 13. In addition, according to the example of the present disclosure, it was possible to accurately calculate the cylinder intake air amount, thereby stabilizing the operating state of the engine, and also reducing the possibility of misfire.

As described above, although the forms of the present disclosure have been described with reference to FIGS. 2 to 5, the present disclosure is not limited to the above-described forms.

For example, when it is determined that the deviation of the predetermined magnitude or more between the actually measured pressure and the model pressure in the intake manifold 13 has been occurred by the brake operation, the actual brake booster inflow flow rate can also be modeled to reflect it to the air-fuel ratio control. For this purpose, it is possible to use a map previously stored in the ECU through several learning, in which the basic capacity of the brake booster and the number of repetitions of the brake are used as an input value and the inflow air amount by the brake booster is used as an output value. In this case, since the basic capacity of the brake booster is a predetermined value, the actual brake booster inflow flow rate can be calculated by measuring the number of repetitions of the brake to input it thereto. When the actual inflow air amount by the brake booster is calculated, a value obtained by summing the actual inflow air amount and the inflow air amount measured by the MAF sensor 1 can be defined as a corrected inflow air amount. Then, the cylinder intake air amount can be calculated in the S17 of FIG. 2 by using the corrected inflow air amount.

Meanwhile, when the brake is operated by depressing a brake pedal several times, the amount of air flowing into from the brake booster 4 increases sharply, and therefore, the actually measured pressure of the intake manifold measured by the MAP sensor 3 changes sharply. Therefore, by using the above, the inflow air amount by the brake booster 4 can also be calculated. Specifically, the inflow air amount by the brake booster 4 can also be calculated by using a map previously stored in the ECU through several learning, in which a change amount per hour of the actually measured pressure of the intake manifold measured by the MAP sensor 3 is used as an input value, and the inflow air amount by the brake booster is used as an output value.

As described above, the forms of FIGS. 2 to 4 control the air-fuel ratio by reflecting the amount of air flowing into by the brake booster 4 to correct the cylinder intake air amount.

However, when the amount of air flowing into from the brake booster 4 is excessive, the combustion state of the engine becomes a lean combustion state. Therefore, in some cases, the lambda control becomes impossible as described above, thereby remarkably increasing the possibility of occurrence of misfire. Therefore, in terms of preventing the misfire phenomenon more actively, a target injected fuel amount rather than the cylinder intake air amount can also be corrected by reflecting the flow rate flowing into the intake manifold from the brake booster. That is, it is possible to perform a control for increasing the fuel injected amount by reflecting the predetermined amount of air flowing into from the brake booster 4. In this case, unlike the case of controlling the air-fuel ratio by increasing the cylinder intake air amount to thereby increase the injected fuel amount, the engine cannot be in the lean state by exceeding a predetermined air-fuel ratio, thereby solving the problem in which the lambda control cannot be performed.

Alternatively, when it is determined that the deviation of the predetermined magnitude or more between the actually measured pressure and the model pressure in the intake manifold 13 has been occurred by the brake operation, the ECU can forcibly feedback-control the air-fuel ratio based on the measured value of the lambda sensor even in the lean condition where the air-fuel ratio is out of a predetermined air-fuel ratio range in which the restriction of the lambda control is imposed. Therefore, it is possible to further reduce the probability of occurrence of misfire.

What is claimed is:
1. An air-fuel ratio control method reflecting a brake booster inflow flow rate, the method comprising:
   measuring, by a manifold absolute pressure (MAP) sensor, an absolute pressure of an intake manifold of a vehicle;
   comparing, by a controller, the measured absolute pressure with a model pressure of the intake manifold calculated based on an intake air amount measured by an air flow sensor;
   determining, by the controller, whether a deviation between the measured absolute pressure and the model pressure of the intake manifold is equal to or greater than a predetermined value;
   determining, by the controller, whether the deviation is caused by a brake operation when the deviation is equal to or greater than the predetermined value;
   correcting, by the controller, the intake air amount based on a rate of a brake inflow flowing into the intake manifold from a brake booster when it is determined that the deviation is caused by the brake operation;
   calculating, by the controller, a cylinder intake air amount based on the corrected intake air amount; and
   performing, by the controller, an air-fuel ratio control based on the calculated cylinder intake air amount.
2. The air-fuel ratio control method of claim 1,
   wherein in correcting the intake air amount, an inflow air amount by the brake booster is obtained by using a map in which the deviation between the measured absolute pressure and the model pressure is used as an input value, and then the inflow air amount by the brake booster is obtained, and
   the intake air amount measured by the air flow sensor is corrected by using the calculated inflow air amount by the brake booster.
3. The air-fuel ratio control method of claim 2,
   wherein when it is determined that the deviation is not caused by the brake operation, the inflow air amount by the brake booster is set to zero (0).
4. The air-fuel ratio control method of claim 1,
   wherein correcting the intake air amount comprises:
   calculating a pressure corrected amount by subtracting an effective pressure deviation in a normal state from the deviation between the measured absolute pressure and the model pressure of the intake manifold; and correcting the model pressure of the intake manifold based on the measured intake air amount and the pressure corrected amount, and wherein the cylinder intake air amount is calculated by using the corrected model pressure of the intake manifold.

5. The air-fuel ratio control method of claim 4, wherein when it is determined that the deviation is not caused by the brake operation, the pressure corrected amount is set to zero (0).

6. The air-fuel ratio control method of claim 1, wherein in correcting the intake air amount, an inflow air amount by the brake booster is obtained by using a map in which a basic capacity of the brake booster and a number of repetitions of the brake operation are used as an input value, and then the inflow air amount by the brake booster is obtained, and wherein the inflow air amount measured by the air flow sensor is corrected by using the calculated inflow air amount by the brake booster.

7. The air-fuel ratio control method of claim 1, wherein correcting the intake air amount comprises:

calculating an inflow air amount by the brake booster by using a map in which a change amount per hour of the actually measured pressure of the intake manifold is used as an input value, and the inflow air amount by the brake booster is used as an output value, and correcting the inflow air amount measured by the air flow sensor by using the calculated inflow air amount by the brake booster.

8. The air-fuel ratio control method of claim 1, further comprising:

correcting a target injection fuel amount based on a flow rate flowing into the intake manifold from the brake booster when it is determined that the deviation is caused by the brake operation; and performing the air-fuel ratio control based on the corrected target injection fuel amount.

9. The air-fuel ratio control method of claim 1, wherein the vehicle comprises a lambda control unit for feedback-controlling an air-fuel ratio based on a value measured by a lambda sensor under an activation condition in which the air-fuel ratio is within a predetermined range, and wherein the air-fuel ratio control reflecting the brake booster inflow flow rate feedback-controls the air-fuel ratio based on the measured value of the lambda sensor even in a lean condition where the air-fuel ratio is out of the predetermined range.

10. An air-fuel ratio control method reflecting a brake booster inflow flow rate, the method comprising:

determining, by a controller, whether a deviation between an actually measured pressure of an intake manifold and a model pressure of the intake manifold calculated based on an intake air amount measured by an air flow sensor is equal to or greater than a predetermined value, wherein the actually measured pressure is measured by a manifold absolute pressure (MAP) sensor;

determining, by the controller, whether the deviation is caused by a brake operation when the deviation has occurred between the actually measured pressure and the model pressure;

calculating, by the controller, a cylinder intake air amount by using the actually measured pressure of the intake manifold measured by the MAP sensor when it is determined that the deviation is caused by the brake operation; and performing, by the controller, an air-fuel ratio control based on the calculated cylinder intake air amount.

11. The air-fuel ratio control method of claim 10, wherein when it is determined that the deviation is not caused by the brake operation, the cylinder intake air amount is calculated by using the model pressure of the intake manifold using the measured intake air amount, and the air-fuel ratio control is performed based on the calculated cylinder intake air amount.

12. The air-fuel ratio control method of claim 10, further comprising: determining whether an intake air amount correctable condition is satisfied, wherein when the intake air amount correctable condition has been satisfied, the intake air amount is corrected.

13. The air-fuel ratio control method of claim 12, wherein when a coolant temperature of an engine is within a predetermined certain range, and the MAP sensor and the air flow sensor are normally operating during a certain time after start-up, it is determined that the intake air amount correctable condition has been satisfied.

14. The air-fuel ratio control method of claim 10, wherein when a vehicle is in a stop state, an engine is in an idle state, a brake is being operated, and when the deviation has occurred between the actually measured pressure and the model pressure, it is determined that the deviation is caused by the brake operation.

15. The air-fuel ratio control method of claim 10, further comprising: confirming whether an engine is in an idle state or in a stop state, wherein when it is determined that the engine has been in the idle state or in the stop state, the air-fuel ratio control reflecting the brake booster inflow flow rate is performed.

* * * * *